United States Patent [19]

Merser

[11] 3,906,611
[45] Sept. 23, 1975

[54] METHOD OF ATTACHING TO AT LEAST ONE OBJECT ONE OF A PLURALITY OF ATTACHMENTS

[75] Inventor: Francis G. Merser, Framingham Center, Mass.

[73] Assignee: Dennison Manufacturing Company, Framingham, Mass.

[22] Filed: July 8, 1974

[21] Appl. No.: 486,561

Related U.S. Application Data

[62] Division of Ser. No. 350,350, April 12, 1973, Pat. No. 3,850,297.

[52] U.S. Cl. ............. 29/417; 29/450; 29/453; 227/67
[51] Int. Cl. ............................ B23p 17/00
[58] Field of Search ............ 29/412, 413, 453, 450, 29/417; 24/150 FP, 150 B; 40/24; 206/343; 227/67; 223/102, 104

[56] References Cited
UNITED STATES PATENTS

| | | | |
|---|---|---|---|
| 3,103,666 | 9/1963 | Bone | 24/150 FP UX |
| 3,273,705 | 9/1966 | Rieger et al. | 206/343 |
| 3,444,597 | 5/1969 | Bone | 24/150 FP |
| 3,470,834 | 10/1969 | Bone | 223/104 X |
| 3,733,657 | 5/1973 | Lankton | 24/150 FP |

*Primary Examiner*—Charlie T. Moon
*Attorney, Agent, or Firm*—George E. Kersey

[57] ABSTRACT

A plurality of attachments, each designed for insertion through at least one object and comprising an elongated filament section extending between object-penetrating parts, are formed into an assembly using frangible means to operatively connect said penetrating parts in a spaced relationship. The penetrating parts of each individual attachment are secured to adjacently positioned frangible means in the assembly in order that they may be consecutively detached from the assembly.

4 Claims, 10 Drawing Figures

METHOD OF ATTACHING TO AT LEAST ONE OBJECT ONE OF A PLURALITY OF ATTACHMENTS

This application is a divisional application of my pending application, Ser. No. 350,350, "ASSEMBLY OF ATTACHMENTS" filed Apr. 12, 1973, now Pat. No. 3,850,297.

This invention relates to attachments of a type designed to be inserted through an object, usually with a view to securing two objects together. In particular, it relates to an assembly of such attachments which greatly facilitates the application of such attachments to the objects with which they are to be associated.

Attachments of the general type here involved have been previously disclosed in Bone U.S. Pat. No. 3,444,597, issued May 20, 1969, and in Kirk, U.S. Pat. No. 3,380,122, issued Apr. 30, 1968, these patents being owned by the assignee of the instant application. Such prior art attachments comprise an object-penetrating part at one end thereof, an elongated filament-like section extending therefrom, and a part at the other end of said filament-like section which is enlarged relative to the thickness or diameter of said section. The object-penetrating part is designed to be passed through a hole (existing or made as part of the attaching operation) in the object with which it is to be associated, that part then remaining on the far side of said object, the elongated section passing through the hole, and the enlarged part remaining on the near side of the object. The object-penetrating part is capable of passing end-wise through said hole, but after it has passed therethrough it will assume its normal position substantially perpendicular to the elongated section and thereby prevent the attachment from escaping in one direction from the object in question. Escapement of the attachment in the other direction is prevented by the enlarged portion.

As is disclosed in the cited patents, attachments of the type in question are generally provided in the form of an assembly or "clip" of a plurality of such attachments — a typical clip includes 25 or more attachments. An attaching device or "gun" such as is disclosed in Bone U.S. Pat. No. 3,103,666, issued Sept. 16, 1963, and owned by the assignee of this application, may be employed to form the hole through the object with which the attachment is to be associated, sever a single attachment from the assembly of attachments, and force its object-penetrating part through the hole which it forms in the object in question and to the far side of that object.

Attachments of the type in question used in conjunction with attaching devices such as those shown in the Bone U.S. Pat. No. 3,103,666 have become extremely widely used in industry, not only for the attachment of tags and labels to articles to be sold on the retail market, where the attachments are particularly effective in preventing unscrupulous shoppers from switching tags — removing a tag from a low-priced article, attaching it to a high-priced article, and then paying only the lower price for the article — but also for securing any group of objects to one another. The attachments in question, particularly when used in connection with attaching devices of the type described, may be operatively applied at an extremely rapid rate even by relatively unskilled personnel, thus greatly reducing the cost of tagging, labeling, and securing objects to one another in general. Indeed, in many commercial areas attachments of the type in question have virtually supplanted all other attaching methods.

It should be noted, however, that certain difficulties have been encountered in using such attachments. For example, when it has been desired to attach two objects, such as the matching garments of a set of wearing apparel, the single object-penetrating part of the attachment has made it necessary to insert the needle of the attaching device through both objects simultaneously. The thickness of the respective objects is of necessity a limiting factor in such an approach, the combined thickness frequently being too great to allow for the penetration of the needle and the subsequent securing of the attachment thereto. Furthermore, the pressure which must often be applied in order to insert the needle through both objects frequently causes undesirable stretching of the fabric, particularly in the area immediately surrounding the point of penetration.

In addition, while the prior art attachments have been extremely useful in securing tags and labels to articles, they have not, however, been available for a variety of additional uses. For example, they cannot simultaneously function as hanging means for objects which are to be displayed in a hanging position, such as scarves, handkerchiefs, and the like. Likewise, they are not capable of being used to form loops in an individual object, such as garment loops, or to function as thread substitutes in certain sewing-type operations.

It is the prime object of this invention to devise an attachment assembly wherein the individual attachments can be readily used to secure two or more objects, and particularly two or more objects having a substantial combined thickness.

It is a further object to combine the individual attachments in such a manner as to facilitate their use with automated attaching devices.

It is still a further object to combine the individual attachments in such a manner that they may be readily inserted into the same or different objects merely by two successive actuations of the attaching device.

Another object is to devise an attachment assembly which permits the individual attachments thereof to be inserted into objects in a manner which will result in the formation of loops having a variety of lengths.

Still another object is to provide an attachment assembly which can be manufactured and assembled inexpensively and by means of simple but effective automatic machinery operations.

To these ends, the present invention comprises an attachment assembly wherein the individual attachments are provided with an object penetration part at each end thereof. The presence of two penetrating parts opens up a vast new area of uses for these filament type attachments. For example, the attachment of two objects no longer requires the simultaneous penetration of both objects through their combined thickness. Rather, it is now possible to combine two objects by inserting the first penetrating part through a first object and the second penetrating part through a second object. The two objects are thereby effectively attached without encountering the difficulties presented by excessive combined thicknesses and by the exertion of substantial pressure to penetrate these thicknesses.

Similarly, the penetrating parts of the attachment may be inserted through a single object either in the same or in different openings. Such an attachment method forms the filament section into a looped configuration which can be used for a variety of applications such as hanger loops for skirts, loops for coat hooks, a tufting device for upholstery, mounting loops for articles to be displayed in a hanging position and the like. The ready penetration of both ends of the attachment also suggests their use for the sewing of fabrics, for providing the long, loose stitches required in a basting operation, for holding solid objects to cardboard displays and for other uses which will be apparent to the practitioner.

Furthermore, the unique manner of combining the attachments into an integral assembly also provides significant advantages. Thus, each penetrating part of the attachment is integrally connected to and strung along a rod by means of a frangible neck piece. The penetrating parts of each individual attachment are consecutively connected by means of adjacent necks. In this manner the first actuation of the attaching device inserts the first penetrating part through an object while leaving the filament attached thereto still connected to the second penetrating part which has remained part of the integral assembly. Upon the next actuation of the device, either with the needle remaining in the same place or having been removed and inserted elsewhere, the second penetrating part is separated from the assembly thus completing the severing and insertion of the attachment. Such an arrangement lends itself to greater speed of fastening as well as to greater automation possibilities for commercial applications, minimizes the possibility of tangling or snagging, and provides for "gun"-type insertion of the penetrating parts at both ends of the attachment.

To the accomplishment of the above, and to such other objects as may hereinafter appear, the present invention relates to the construction of an assembly or clip of a plurality of attachments, as defined in the appended claims and as described in the specification taken together with the accompanying drawings in which:

FIG. 1 is a semi-schematic view showing a clip of attachments constructed in accordance with the present invention being used in conjunction with an attaching device of the type shown in the Bone U.S. Pat. No. 3,103,666, with the needle of the attaching device about to penetrate an object;

Figure 8:
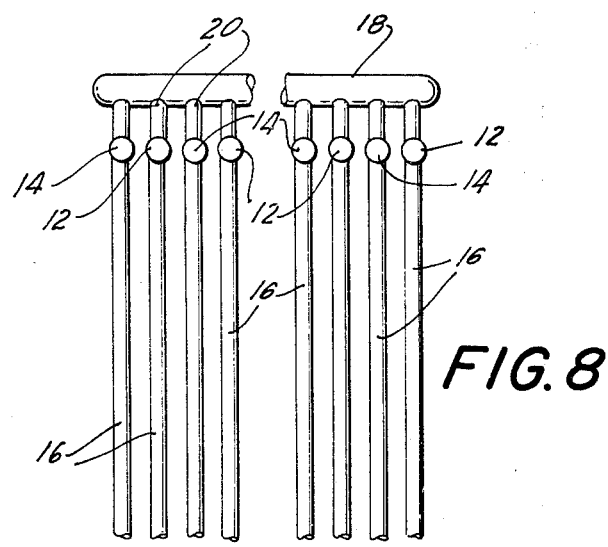
FIG. 8 is a front elevational view of the assembly of FIG. 7.
Figure 9:
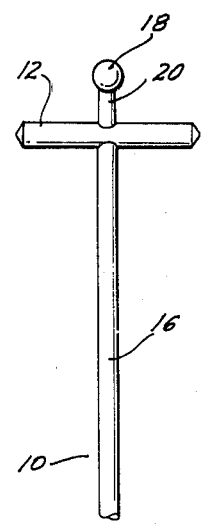
FIG. 9 is a side elevational view of the assembly of FIG. 7.
Figure 9:
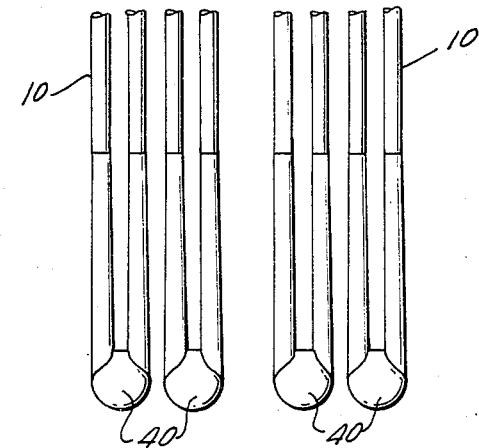
Figure 10:
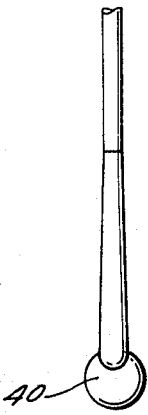
FIG. 10 is a bottom plan view of the assembly of FIG. 7.
Figure 10:
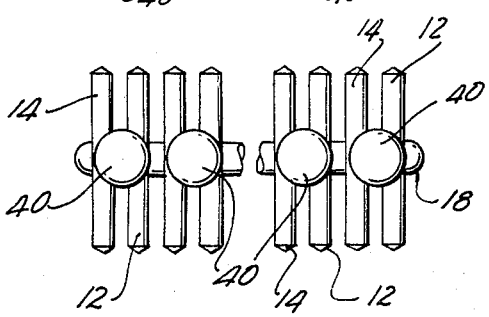

In the embodiment depicted in FIGS. 7–10, the attachment 10 comprises a bar-like, object-penetrating part 12 at one end, a similar bar-like object penetrating part 14 at the other end and an elongated filament section 16 connecting parts 12 and 14. Penetrating parts 12, 14 are illustrated as relatively thin cylinders connected at their midpoints to filament 16 and extending generally at right angles to said filaments 16 to form a generally T configuration (see FIG. 9). They are shown in FIG. 8 as having a circular cross section but various other shapes may be suitable. In operation, as will be described in more detail hereinafter, each penetrating part is inserted through an object along its axial direction, the object being threaded onto the filament 16 adjacent the penetrating part, the penetrating part thereafter serving to retain the object on the filament 16. Accordingly, each penetrating part must have a sufficient maximum length-to-width ratio to effectively prevent the object from slipping off the filament 16. In addition, each penetrating part must have a sufficiently small effective cross section to allow it to be threaded through the object without producing a sizable or noticeable hole therein.

The attachment assembly of this invention (FIG. 8) comprises a plurality of the attachments 10 connected together and strung along a mounting rod or runner 18 by means of narrow, frangible necks 20.

Each of the object-penetrating parts, as represented by 12 and 14, are integrally attached to mounting rod 18 by necks 20 with the penetrating parts of each individual attachment being connected by means of adjacently positioned necks 20. In the resulting assembly, filament 16 is in looped configuration extending between adjacent penetrating parts 12, 14, which, in turn, are connected to rod 18 by adjacent frangible necks 20. This construction is particularly well suited for use with attaching devices of the Bone U.S. Pat. No. 3,103,666 variety inasmuch as two consecutive actuations of the device can rapidly (in two steps or operations) sever the attachment from the assembly and insert it through one or more objects.

The assembly and the individual attachments thereof are preferably integrally molded of a thermoplastic material such as, but not restricted to, nylon. In a typical embodiment of an individual attachment, the filament 16 extends approximately four inches in length while parts 12, 14 are approximately thirteen-thirty-seconds in. in length and 0.045 inch in diameter. It should be noted, however, that these dimensions may be varied considerably depending upon the particular attachment and its specific end use application.

The manner of use and functioning of the attachment assembly described herein will now be apparent. As is made clear in the Bone U.S. Pat. No. 3,103,666 and as is shown in FIGS. 1–4, the attaching gun generally designated 22 is provided with an object penetrating needle 24 having a slot along one side thereof connecting with a slot 28 on the side of the gun 22 proper. The clip of attachments is adapted to be inserted into gun 22 so that mounting rod or runner 18 passes through the gun 22 along with the object-penetrating parts 12, 14, while the filament section 16 passes through a slot 30 formed in the side of the gun, until the object-penetrating part 12 of the attachment 10 is brought in line with the slotted needle 24. Thereafter when handle 32 of the gun 22 is squeezed, a plunger engages the end of the penetrating part 12 of the leading attachment, causes it to move relative to the neck 20 so as to sever it from the latter, and then pushes penetrating part 12 out through needle 24 with the filament 16 connected thereto, moving along the slots 26 and 28. In order to associate the attachment with one or more objects 34 generally the operator, once he has inserted a clip of attachments into the attaching gun 32, pushes the needle 24 through the object 34, that needle 24 forming a hole in object 34. Then actuation of handle 32 separates the penetrating part 12 of the leading attachment 10 from the remainder of the clip and pushes that part through needle 24 and out the tip of the needle 24. As penetrating part 12 moves past the object 34, the filament 16 is pulled inwardly toward the needle 24 and is bent over onto the trailing portion of part 12 so that it is threaded through object 34 with part 12. It will therefore be apparent that the size of the hole produced in object 34 depends not only on the size of the needle but also on the effective cross-sectional area of the filament 16. As part 12 leaves the needle 24, it assumes a position substantially at right angles to the surface of object 34, thus preventing the attachment 10 from disengaging itself from the object 34 when the attaching gun 22 is withdrawn pulling its needle out from object 34. At this point, part 12 is attached to object 34 while filament 16 is still connected to penetrating part 14 which has remained part of the integral assembly in the attaching gun 22.

Thereafter, needle 24 may be retained in the same opening in object 34, pushed through a different section of object 34, or pushed through a second object 38. Actuation of handle 32 then separates penetrating part 14 of the leading attachment 10 from the remainder of the clip and pushes that part through needle 24 and out of the tip of needle 24. At this point, attachment 10 is totally severed from the clip. As part 14 leaves the needle 24, it is threaded through the object along with filament 16 and assumes a position substantially at right angles to the surface of the object, thus preventing the attachment 10 from disengaging itself from the object. The inserted attachment 10 now either connects two distinct objects or exhibits a looped configuration in a single object.

Figure 1:
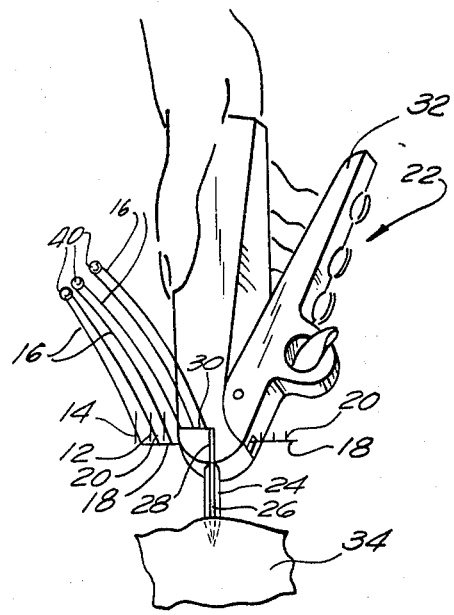
Figure 2:
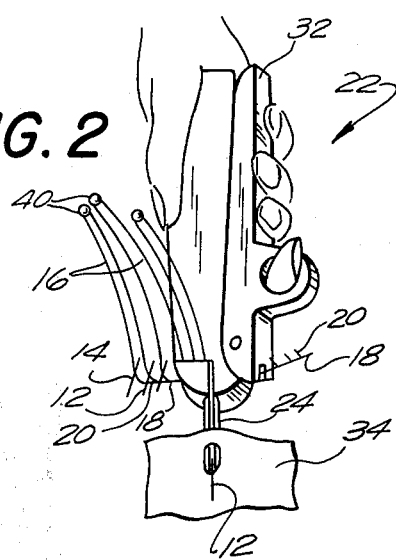
FIG. 2 is a view similar to FIG. 1 showing the needle having penetrated the object and the attaching device actuated so as to sever the first object-penetrating part of the leading attachment from the clip and move it through the needle and the hole formed in the object to the far side of said object.
Figure 3:
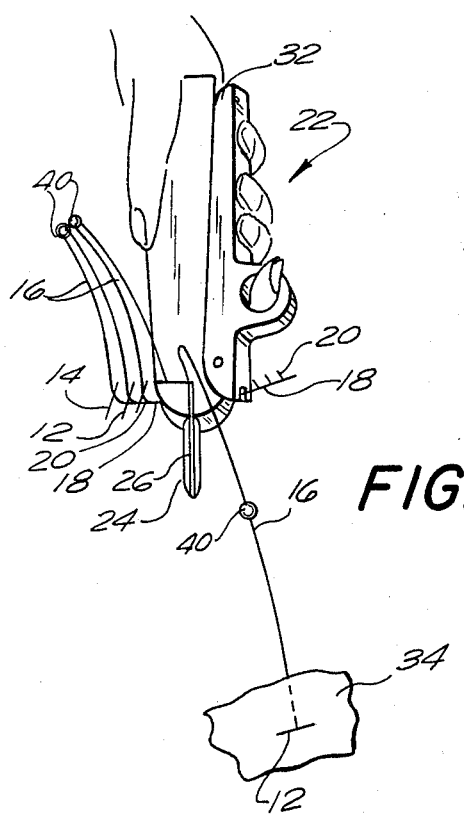
FIG. 3 shows the attaching device having been withdrawn, the leading attachment now being associated with the object by means of its first object-penetrating part but still being connected to the clip by means of its second object-penetrating part.
Figure 4:
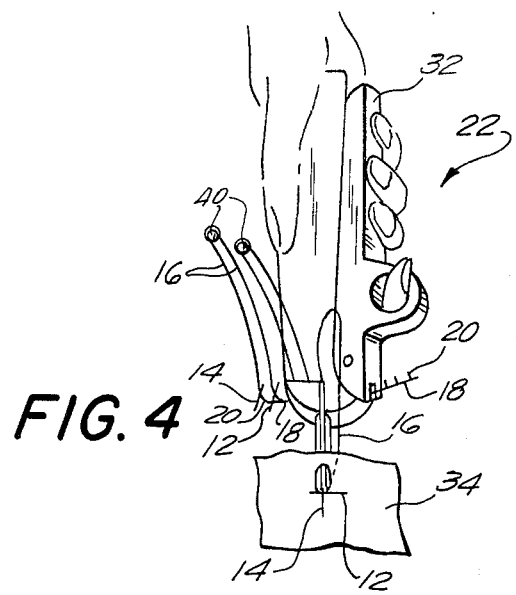
FIG. 4 shows the reinsertion of the needle into the identical hole in the object, and the actuation of the attaching device to sever the second object-penetrating part of the leading attachment and move it through the needle and hole also to the far side of the object.
Figure 5:
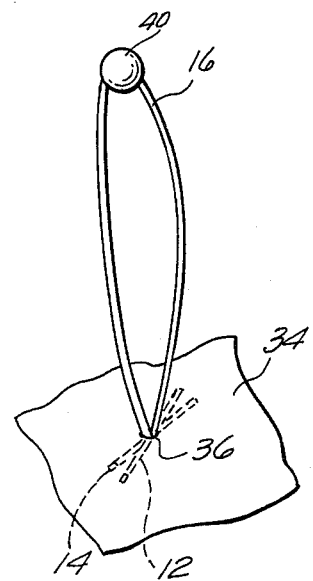
FIG. 5 is a perspective view of the operatively engaged attachment having both of its object-penetrating parts associating with a single object through a single hole therein to produce a loop configuration.

FIG. 5 depicts the situation where penetrating parts 12 and 14 are inserted into object 34 through the same opening 36. It is thus seen that when part 12 has been inserted into object 34 it is merely necessary to retain needle 24 in said opening 36 and actuate gun 22 a second time in the manner described hereinabove. The second actuation will thus sever the still attached penetrating part 14 and push it through needle 24. As penetrating part 14 leaves needle 24 it also assumes a position substantially at right angles to the surface of object 34. Upon removing needle 24 from object 34, it is seen that filament 16 has been formed into a loop configuration which may be used for the various applications previously enumerated.

Figure 6:
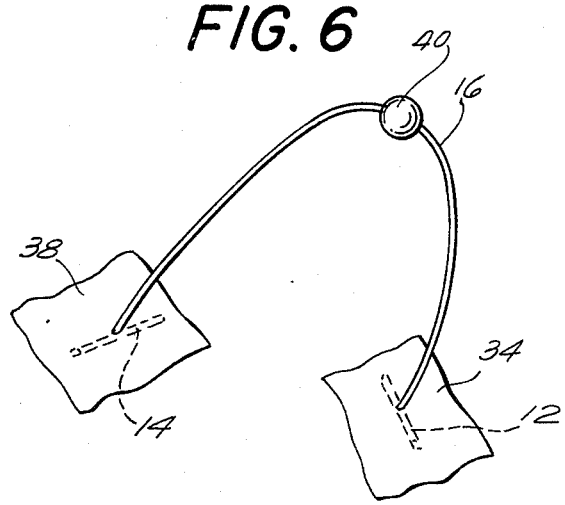
FIG. 6 is a perspective view of the operatively engaged attachment having each of its object-penetrating parts associating with a separate object.
Figure 7:
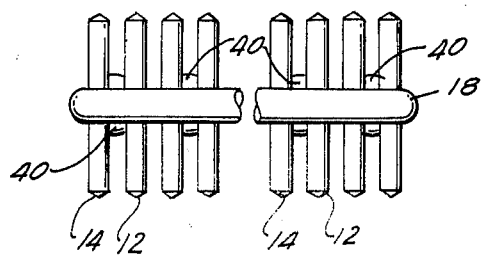
FIG. 7 is a top plan view of an assembly of attachments made in accordance with the present invention.

FIG. 6 depicts the insertion of parts 12 and 14 into two separate objects 34, 38. Thus, after penetrating part 12 has been inserted into object 34, as indicated above, needle 24 is removed and inserted through object 38. Subsequent actuation of gun 22 severs part 14 and inserts it, in the manner described hereinabove, into object 38 where it assumes a position substantially at right angles to the surface thereof. Upon removal of needle 24, articles 34 and 38 are secured to each other by means of filament 16.

A further possibility is the insertion of the attachment through two separate holes in a single object (not shown). Thus, after the first penetrating part has been inserted through the object, as described hereinabove, the needle is removed and inserted through a second hole in the object. Severing and insertion of the second penetrating part results in an attachment which is either in looper or stitch-type configuration depending upon the length of the attachment and the distance between the respective openings. It is this possibility of forming long, loose stitches that permits these attachments to be used in a basting operation. Thus, rather than pinning up or sewing a hem, temporary securing of the measured hem may be rapidly and effectively achieved by inserting the attachments, in the manner described, at consecutive points along the hem the distance between the insertion points being slightly less or substantially equal to the length of the filament.

By means of the construction of the present invention, clips of attachments may be formed with the same facility and relative inexpensiveness as is the case with comparable attachments now on the market. The instant clips will have the significant advantages, however, of containing attachments which exhibit two objectpenetrating parts and of being constructed such that both parts may be rapidly and consecutively severed from the assembly and inserted into one or more objects. The construction also prevents tangling of the individual elongated attachments inasmuch as both ends of the attachment are secured to the mounting rod, thus holding the attachments in proper orientation while they remain in the clip. This orientation is also maintained during insertion inasmuch as, subsequent to the insertion of the first penetrating part, the attachment is secured to the first object and to the clip in the gun while preparation is being made for insertion of the second penetrating part.

As previously indicated, the attachments may be utilized to combine two objects; to provide objects with loop attachments which can serve both as conventional attachments as well as mounting means; to function as thread substitutes in various sewing operations; and the like.

The enlargements 40 connecting the free ends of adjacent filaments 16 are present to assist in stretching the filaments 16 when formed of nylon, thereby to improve their tensile strength. Those enlargements 40 serve to maintain separated the two objects 34 and 38 joined by the attachment, and when that is desired, the enlargements 40 may still be provided even if not needed to facilitate filament stretching (as when the filaments are formed of urethane or some other elastomer).

While the invention has been described in terms of the specific embodiments herein, it should be apparent that variations may be developed without departing from the spirit or scope of the invention.

What is claimed is:

1. The method of attaching to at least one object one of a plurality of attachments which are formed into a clip by having both ends thereof connected to a mounting element, said attachment comprising a filament and a pair of object-penetrating parts, one at each end of said filament, which method comprises
   a. freeing one end of said attachment ends from said clip and engaging the object-penetrating part present on said end with said object while said attachment remains secured to said clip at said other end; and
   b. thereafter freeing the other end of said attachment from said clip and engaging the object-penetrating part present on said other end with said object.

2. The method of claim 1, wherein each of said object-penetrating parts is engaged with a separate object.

3. The method of attaching to at least one object one of a plurality of attachments which are formed into a clip by having both ends thereof connected to a mounting element, said attachment comprising a filament ad a pair of object-penetrating parts, one at each end of said filament, which method comprises
   a. feeding said clip into an attaching device having needle and plunger inserting means,
   b. aligning one end of said attachment and the object-penetrating part thereon with said inserting means,
   c. actuating said device to free said aligned attachment end from said clip, to engage the object-penetrating part present on said end with said object and to align said other end of said attachment with said inserting means, said attachment remaining secured, at said other end, to the clip in said attaching device, and
   d. actuating said device to free the other end of said attachment from said clip and to engage the object-penetrating part on said other end with said object.

4. The method of claim 3, wherein each of said object-penetrating parts is engaged with a separate object.

* * * * *